United States Patent [19]

Masaki et al.

[11] Patent Number: 5,157,739
[45] Date of Patent: Oct. 20, 1992

[54] DIGITAL IMAGE PROCESSING APPARATUS

[75] Inventors: Yasuo Masaki; Kimitoshi Hori; Hiroshi Uchino, all of Osaka, Japan

[73] Assignee: Minolta Camera Kabushiki Kaisha, Osaka, Japan

[21] Appl. No.: 726,169

[22] Filed: Jul. 2, 1991

Related U.S. Application Data

[63] Continuation of Ser. No. 242,687, Sep. 9, 1988, abandoned.

[30] Foreign Application Priority Data

Sep. 10, 1987 [JP] Japan .................................. 62-228099
Sep. 10, 1987 [JP] Japan .................................. 62-228100

[51] Int. Cl.$^5$ .............................................. G06K 9/00
[52] U.S. Cl. ........................................ 383/49; 382/27
[58] Field of Search ......................... 382/41, 49, 27; 364/131, 133

[56] References Cited

U.S. PATENT DOCUMENTS

| | | | |
|---|---|---|---|
| 4,301,443 | 11/1981 | Sternberg et al. | 382/49 |
| 4,484,346 | 11/1984 | Sternberg et al. | 382/49 |
| 4,665,556 | 5/1987 | Fukushima | 382/49 |
| 4,845,663 | 7/1989 | Brown et al. | 382/41 |
| 4,850,027 | 7/1989 | Kimmel | 382/41 |
| 4,876,651 | 10/1989 | Dawson et al. | 382/49 |

Primary Examiner—Leo H. Boudreau
Attorney, Agent, or Firm—Burns, Doane, Swecker & Mathis

[57] ABSTRACT

An image input circuit, an image memory, an image processing circuit and an image output circuit are controlled by a host CPU through a host CPU bus and are connected by an image data bus so as to enable data transfer between each other. The image memory, image processing circuit and the image data bus for multiple-valued image and those for binary image are prepared. Consequently, storing, processing and transfer of multiple-valued image data and those for binary image data can be carried out independently from each other.

16 Claims, 8 Drawing Sheets

DIGITAL IMAGE PROCESSING APPARATUS

This application is a continuation of application Ser. No. 07/242,687, filed Sep. 9, 1988, now abandoned.

BACKGROUND OF THE INVENTION

1. Field of the Invention

The present invention generally relates to a digital image processing apparatus and, more specifically, to a digital image processing apparatus arithmetically processing original image data for effecting image data converting process such as gradation correction, sharpening of image quality, and other processes such as feature extraction from original image data.

2. Description of the Prior Art

A digital image processing apparatus comprises hardware such as an image input circuit for inputting image data, an image output circuit for outputting image data, an image memory for storing image data, a processing circuit for arithmetically processing image data, and so on; a host CPU controlling such hardware and arithmetically processing image data by means of software; and so on. In some cases, a control circuit for high speed hardware control, which can not be provided by the software processing by the host CPU, is included.

The arithmetic operation comprises processing of the image data provided from the image input circuit or of the data read from the image memory carried out by a processing circuit, and processing carried out on the data on the image memory by the host CPU by means of software. The hardware processing employing the processing circuit is preferred for high speed processing. In that case, the image input circuit and the processing circuit, or the image memory and the processing circuit must be coupled with each other in one way or another so as to enable exchange of image data. When the hardware structure is limited, the coupling can be implemented by prescribed signal lines. When the structure of the hardware must have flexibility and capability of being extended, the coupling employing data buses is necessary. Especially, in a general purpose image processing apparatus having various arithmetic functions to be utilized for many purposes, a data bus for exclusive use is provided in general to transfer image date between each of the circuits of the hardware.

Figure 1:
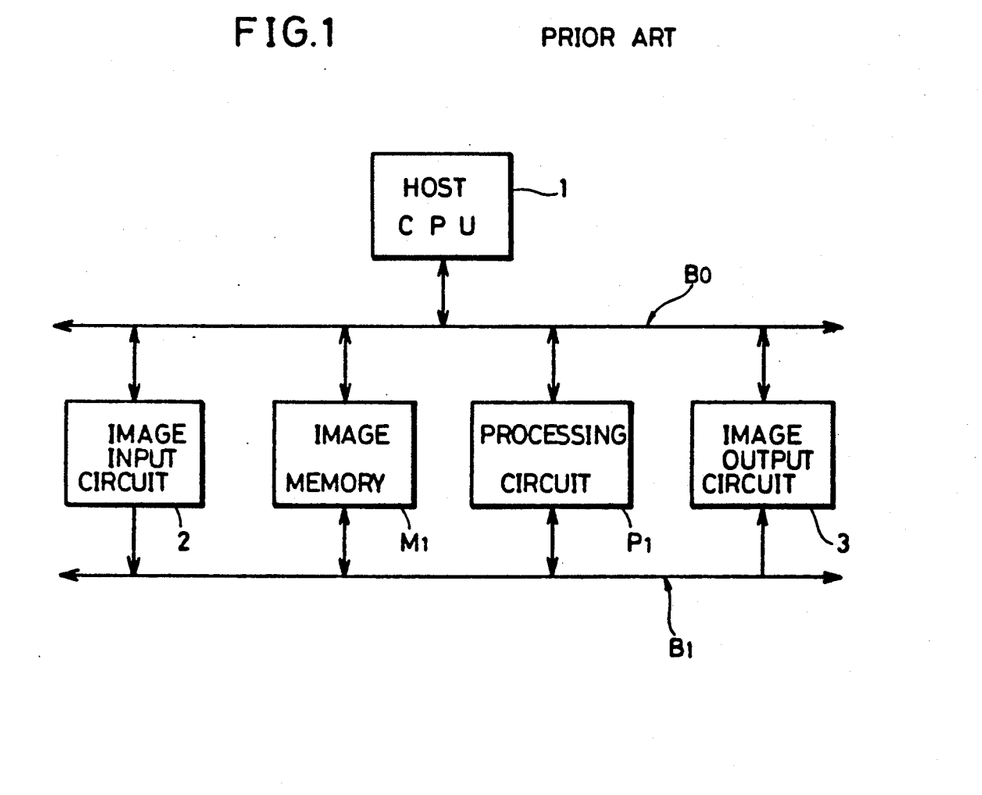
FIG. 1 is a block diagram showing a whole structure of a conventional digital image processing apparatus.

FIG. 1 shows a structure of a conventional image processing apparatus in which portions of the hardware are coupled with each other by data buses exclusively used for image data. As is shown in the figure, the image processing apparatus comprises a host CPU 1, an image input circuit 2, an image output circuit 3, an image memory M1, a processing circuit P1, a host CPU bus B0 and an image date bus B1. The number of the image input circuit 2, image output circuit 3, image memory M1 and of the processing circuit P1 may be two or more if necessary.

The input of the image data is effected by transferring image data from the image input circuit 2 to the image memory M1 through the image data bus B1.

The image data read out from the image memory M1 are inputted to the processing circuit P1 through the image data bus B1 to be arithmetically processed, and the resulting image data are again written in the image memory M1 through the image data bus B1, thus the arithmetic processing of the image data is completed.

The output of the image data is effected such that the image data read from the image memory M1 are outputted to external image display apparatus, image recording apparatus and the like through the image data bus B1 and the image output circuit 3.

The image data obtained from the image input circuit 2 can be directly brought to the processing circuit P1 and the data outputted from the processing circuit P1 can be directly brought to the image output circuit 3 dependent on the internal structure of the image data bus B1. In this manner, the operating states such as image input, image processing, image output are determined by the connection between each of the circuits through the image data bus B1.

In the foregoing, whether the image data to be handled is multiple-valued image data (or gray data) having a plurality of bits of information per 1 pixel or binary image data having 1 bit of information per 1 pixel was not taken in consideration. In general, in image data processing, multiple-valued images and binary images are often handled together: for example, there are such cases where a first inputted multiple image data is binary converted, with the binary image being processed; multiple valued image data are processed using a binary data as a control data. Therefore, each of the circuits in FIG. 1 and the image data bus B1 must treat both the binary image and the multiple-valued image. They must have the bit width at least corresponding to the gradation of the multiple-valued image to be handled.

Conventionally, when a binary image is handled in such image processing apparatus, for example, when the processing circuit P1 generates a binary image as a result of processing and the data is stored in the image memory M1, the binary image is expanded to a multiple-valued image to be stored in the image memory M1 for multiple-valued images. In order to expand a binary image to a multiple-valued image, "1" and "0" are changed to be in correspondence with respective bits of a multiple-valued image. When a pixel of the multiple-valued image is represented by 8 bits, "1" and "0" of the binary image are respectively expanded to 255 (1,1,1,1,1,1,1,1) and 0 (0,0,0,0,0,0,0,0). By expanding in this way, the arithmetic operation on binary image can be carried out in the processing circuit P1 for multiple-valued images to provide appropriate result. By employing values corresponding to a white level and black level in the multiple-valued image as the specified two values, the binary image data can be directly displayed on a circuit for displaying multiple-valued images.

As an example of the treatment of binary images in the image processing apparatus, the binary image is used as control data for switching arithmetic functions of the processing circuit P1. For example, in a maximum value evaluating operation in which two planes of image data are compared with each other to determine larger value at each pixel position, subtraction operation is carried out for every pixel between two planes of multiple-valued images, a binary image is provided which corresponds to a borrow data generated at that time, and two planes of multiple-valued images are switched from each other on pixel by pixel basis to be synthesized using the binary image.

Figure 2:
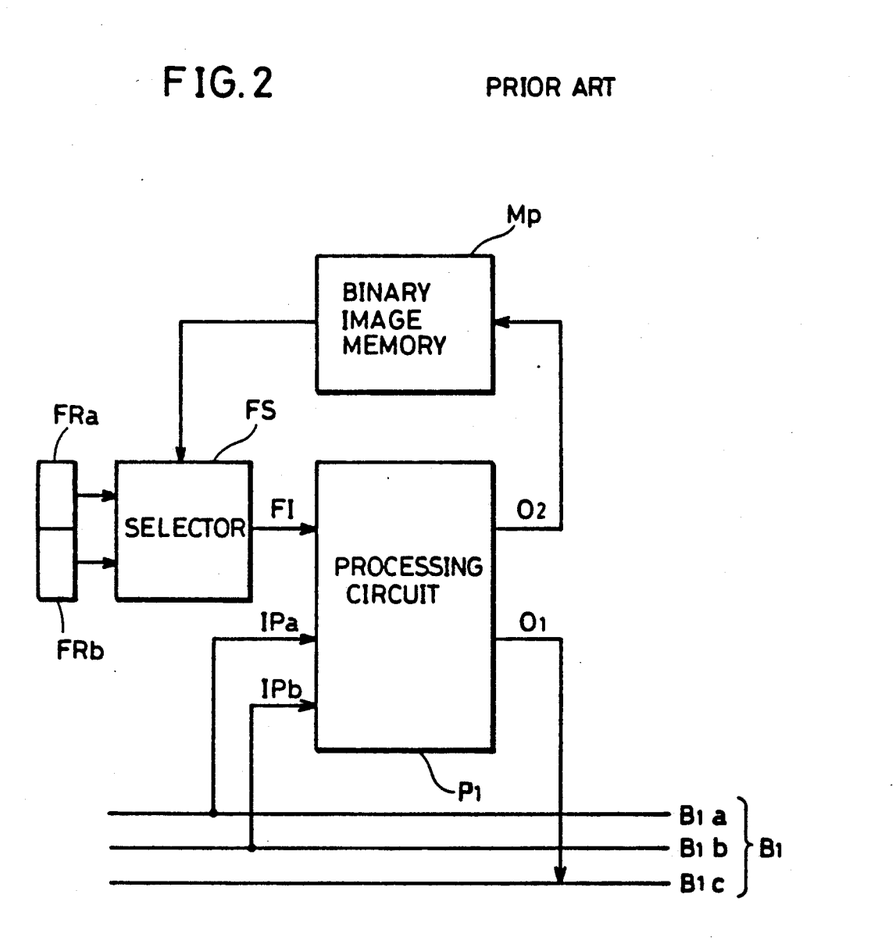
FIG. 2 is a block diagram showing connections between a processing circuit and peripheral circuits employed in the embodiments of FIG. 1.

FIG. 2 shows a processing circuit P1 capable of switching arithmetic functions by means of a binary image and the connection of the processing circuit P1 and the peripheral circuits proposed prior to the present invention. In the figure, a binary image memory Mp is provided attendant on the processing circuit P1 for storing data of binary images outputted from the processing circuit P1. Function registers FRa and FRb are provided for designating arithmetic function of the processing circuit P1. A function selector FS is provided for switching the values of two function registers FRa and FRb in accordance with read data from the binary image memory Mp to apply the same to a function input FI of the processing circuit P1. Image data buses B1a and B1b are provided for supplying image data to two image data input ports IPa and IPb. An image data bus B1c is provided for supplying the result of processing outputted from the processing circuit P1 to other circuits.

In the above described maximum value evaluating process, the data of two planes of images are inputted to the processing circuit P1 through data buses B1a and B1b in the first frame. A function code designating subtraction processing is set in both function registers FRa and FRb. The processing circuit P1 carries out the subtraction processing regardless of the state of the function selector FS. A binary image output terminal O2 of the processing circuit P1 is separately set such that borrow data generated by the subtraction processing is outputted therefrom, and a binary image corresponding to the borrow data of each pixel is stored in the binary image memory Mp. In the second frame, a function code for directly outputting the image data inputted to the input ports IPa and IPb is set in the function registers FRa and FRb. The function selector FS switches functions to apply the same to the processing circuit P1 based on the borrow data outputted for each pixel from the binary image memory Mp. Data of two planes of images are inputted to the processing circuit P1 from the data buses B1a and B1b as in the first frame, and data of two planes of images are switched between each other in accordance with the switching of the function to be outputted from the multiple-valued image output terminal O1 as the result of processing. Since the switching of the function is carried out based on the borrow data dependent on magnitude of two planes of image data, the maximum value evaluated image output can be obtained as the result of processing. By changing the setting of the function code, the minimum value output can also be provided.

In the foregoing, description was given of the handling of binary images in a conventional image processing apparatus with reference to FIGS. 1 and 2. The conventional method for treating binary images mainly comprises the following three disadvantages.

(1) Disadvantages derived from the use of a circuit originally designed for multiple-valued images for binary images by expanding the binary image to the multiple-valued image when a binary image is handled as the result of processing or as the data to be processed. First, it is uneconomical, because a number of multiple-valued image memory having unnecessary large capacitances must be provided when a number of image memories are required for binary images. It is difficult to implement arithmetic functions characteristic of binary images effectively in hardware since the binary images are handled in the same bit widths as multiple-valued images in the processing circuit. In addition, the number of data bus can not be freely increased since the width of the whole data bus becomes large, when a number of binary images should be handled simultaneously.

(2) Disadvantages derived from attendant arrangement of the binary image memory for switching arithmetic function of the processing circuit on the processing circuit. First, it is uneconomical when processing circuits of the same type are to be increased in accordance with the object of processing since binary image memories are arranged no matter whether they are needed or not. It is difficult to increase the number of binary image memories, since the binary image memory is attendant on the processing circuit. It is difficult to control a processing circuit by using binary image generated in another processing circuit, and it is difficult to carry out arithmetic operation between binary image memories belonging to different processing circuits, since the relation between the processing circuit and the binary image memory is fixedly determined.

(3) Disadvantages derived from different handling of binary images. Binary images resulting from the processing and binary images to be processed are expanded to multiple-valued images and the data bus B1 and the image memory M1 are used for processing. The binary image used for switching arithmetic function of the processing circuit P1 is processed by using the binary image memory Mp arranged attendant on the processing circuit P1. The handling of binary image is troublesome, since the binary images are sometimes expanded to the multiple-valued images and sometimes not, and the portions for handling binary images are different case by case, as described above. The characteristics of the binary images are not always fixed, and there is a request, for example, for arithmetic operation on binary images on the binary image memory Mp. The conventional apparatus is not suitable for flexible handling of binary images.

SUMMARY OF THE INVENTION

An object of the present invention is to provide a digital image processing apparatus capable of effectively handling multiple-valued image data and binary image data.

Another object of the present invention is to provide a digital image processing apparatus in which all of the binary image data handled in the apparatus are employed as input/output of binary images to and from a processing circuit.

Briefly stated, in the present invention, image input/output circuits, image memories and processing circuits controlled by control means are connected with each other by image data buses to enable data transfer and image memories, processing circuits and image data buses are separately provided for multiple-valued images and for binary images, respectively.

According to the present invention, since the storing, processing and transfer of multiple-valued image data and those of binary image data are carried out in separate system, binary images can be stored effectively in small capacitances. Arithmetic function peculiar to processing of binary images can be implemented effectively in hardware. The transfer of binary image data of 1 plane can be effected by one data bus. Efficiency in storing, processing and transferring binary image data can be greatly enhanced. Since the binary image memory is connected to the processing circuit through the data bus for binary image and not subject to the processing circuit as was the prior art, the binary image memory is not subject to a specific processing circuit. The binary image memory is not subject to any particular processing circuit. Therefore, binary image memories and processing circuits are easily increased. Changes in design for the increase is small. The present invention enables arithmetic operations between contents of different binary image memories, sharing of binary images between different processing circuits, thereby enlarging the range of utilizations of binary images. Since the binary image memories are connected to a data bus for binary image memories, the binary images on the binary image memories can be used as the data to be processed, data resulting from processing, and as the control data. Therefore, there is no need to change the place of storing binary images in accordance with the characteristics of the binary images, thereby eliminating the trouble in handling binary images.

According to another aspect of the present invention, a data bus for transferring binary image data is provided in addition to the data bus for transferring multiple-valued image data, wherein binary image data generated from a first processing circuit can be outputted to the data bus for binary image and binary image data on the data bus for binary image can be used as binary image data for switching processing function of a second processing circuit. Consequently, the second processing circuit can be directly controlled by the binary image data generated from the first processing circuit and there can be provided wide variation of processes employing multiple-valued images and binary images together.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
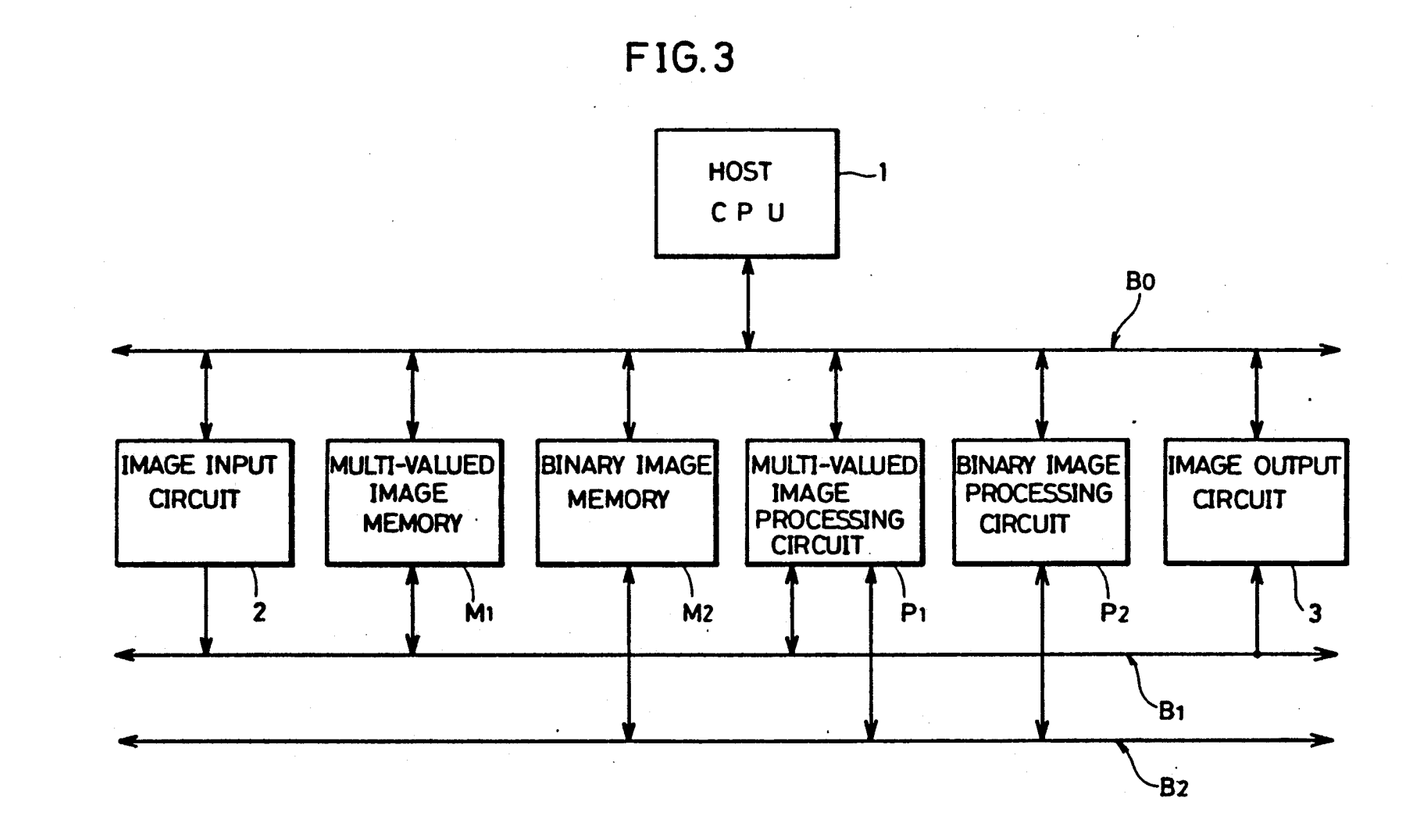
FIG. 3 is a block diagram showing a whole structure of a digital image processing apparatus in accordance with one embodiment of the present invention.

A schematic structure of one embodiment of the present invention will be described in the following with reference to FIG. 3. Referring to FIG. 3, the present embodiment comprises an image input circuit 2 for inputting image data; an image output circuit 3 for outputting image data; image memories M1 and M2 for storing image data; processing circuits P1 and P2 for processing image data; a host CPU for controlling the hardware; and image data buses B1 and B2 for transferring image data between each components of the hardware.

The image memory comprises the multiple-valued image memory M1 for storing data of multiple-valued images in which 1 pixel has a plurality of bits of information, and a binary image memory M2 for storing data of binary images in which 1 pixel has 1 bit information, independent from each other. The processing circuits comprises multiple-valued image processing circuit P1 for processing multiple-valued images, and binary image processing circuit P2 for processing binary images, independently. The data bus comprises a multiple-valued image data bus B1 for transferring data of multiple-valued images between circuits handling multiple-valued images, and binary image data bus B2 for transferring data of binary images between circuits handling binary images, independently.

The number of the image memory M1 and of the processing circuit P1 for multiple-valued images and the number of the image memory M2 and of the processing circuit P2 for binary images can be increased, if necessary. The number of the data bus B2 exclusively used for binary images can be also increased, if necessary.

The flow of data in the image processing apparatus shown in FIG. 3 will be described in the following.

First, image data is taken in as multiple-valued image by the image input circuit 2 to be outputted on the data bus B1 for multiple-valued images. The multiple-valued image on the data bus B1 is inputted and stored in the multiple-valued image memory M1. The multiple-valued image on the data bus B1 may be directly inputted to the multiple-valued image processing circuit P1 to be processed therein, or it may be directly inputted to the image output circuit 3 to be externally outputted, if necessary.

The multiple-valued image stored in the multiple-valued image memory M1 is again outputted on the multiple-valued image data bus B1 to be inputted to the multiple-valued image processing circuit P1 for processing. In the processing circuit P1, arithmetic processes are carried out on the inputted multiple-valued image, with the processed output being either the multiple-valued image or the binary image. When a multiple-valued image is outputted, it is outputted on the multiple-valued image data bus B1. When a binary image is outputted, it is outputted to the binary image data bus B2. The data outputted to the data bus B1 or B2 from the processing circuit P1 is stored in the multiple-valued image memory M1 when the data is for the multiple-valued image, or in the binary image memory M2 when it is for the binary image.

In arithmetic processing of binary images, a binary image is read from the binary image memory M2 to the binary image data bus B2 and the binary image on the data bus B2 is inputted to the binary image processing circuit P2. The binary image obtained as the result of processing is again outputted to the binary image data bus B2. When processing should be carried out between a plurality of binary images, a plurality of binary image memories M2 are provided, and a number of binary image data buses B2 should be provided, the number corresponding to the number of planes of binary images inputted and outputted to and from the processing circuit P2. The source of the binary images to be processed is not limited to the data read from the binary image memory M2. The binary images to be processed may be outputted from the multiple-valued image processing circuit P1 or from other binary image processing circuits (not shown).

Figure 4:
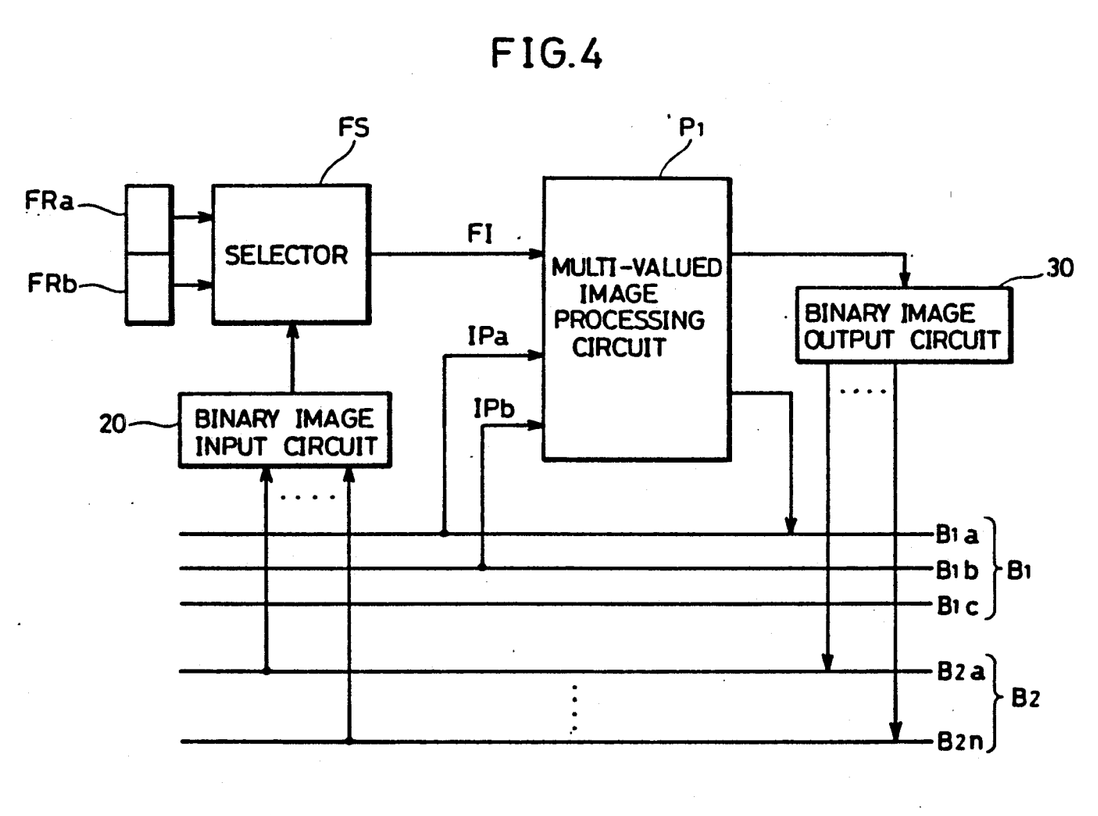
FIG. 4 is a block diagram showing connections between multiple-valued image processing circuit and the peripheral circuits thereof employed in the embodiment of FIG. 3.

FIG. 4 is a block diagram showing connections between the multiple-valued image processing circuit and the peripheral circuits thereof in the embodiment of FIG. 3. Portions having the same functions as the circuits of FIG. 2 are denoted by the same reference characters and descriptions thereof are omitted. In this embodiment, the binary image memory Mp attendant on the processing circuit P1 is omitted, and alternatively, a binary image input circuit 20 for selecting one from binary images inputted from a newly provided binary image data bus B2(B2a~B2n) for applying the same to function selector FS, and a binary image output circuit 30 for outputting the binary image generated by the processing circuit P1 to a prescribed binary image data bus B2 are added to the prior art of FIG. 2. These changes and additions enable switching of function by a general binary image on the binary image data bus B2 and the output of the binary images outputted from the processing circuit P1 to the binary image data bus B2, thereby widening a variety of application.

Figure 5:
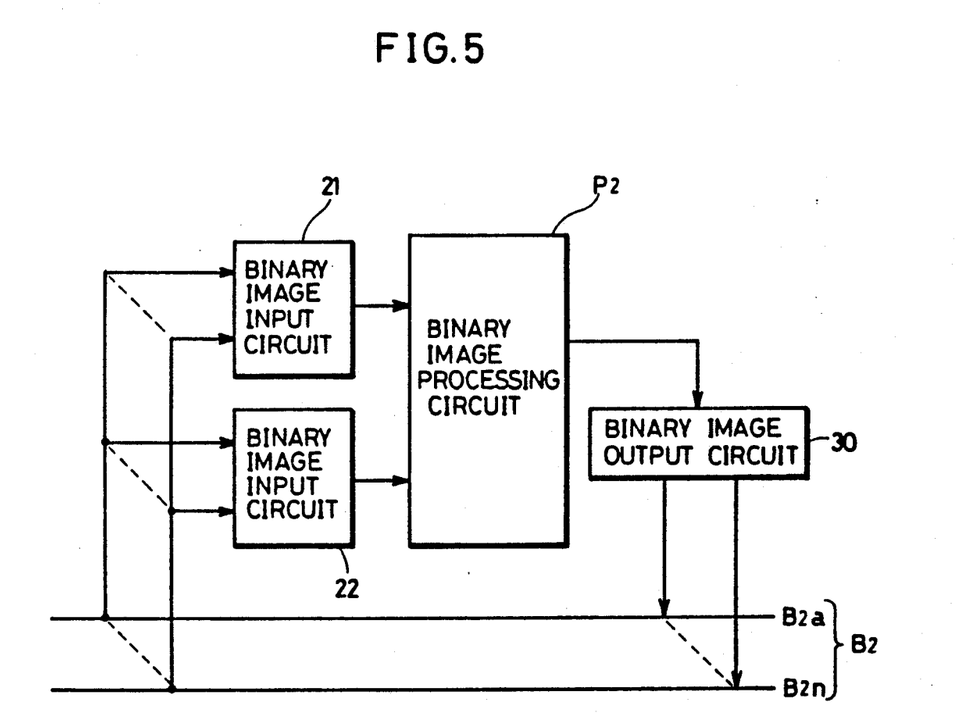
FIG. 5 is a block diagram showing connections between a binary image processing circuit and peripheral circuits thereof employed in the embodiment of FIG. 3.

FIG. 5 is a block diagram showing connection between the binary image processing circuit and the peripheral circuits thereof in the embodiment of FIG. 3. Referring to the figure, the processing circuit P2 processes two binary image inputs. The binary image input circuits 21 and 22 select one of the binary images on the binary image data bus B2, respectively, thereby providing two binary images to be processed to the processing circuit P2. The binary image output circuit 30 outputs the binary image output of the processing circuit P2 to a prescribed binary image data bus B2.

The specific operation state of the multiple-valued image processing circuit P1 and the binary image processing circuit P2 will be described in the following with reference to the figures.

Figure 6:
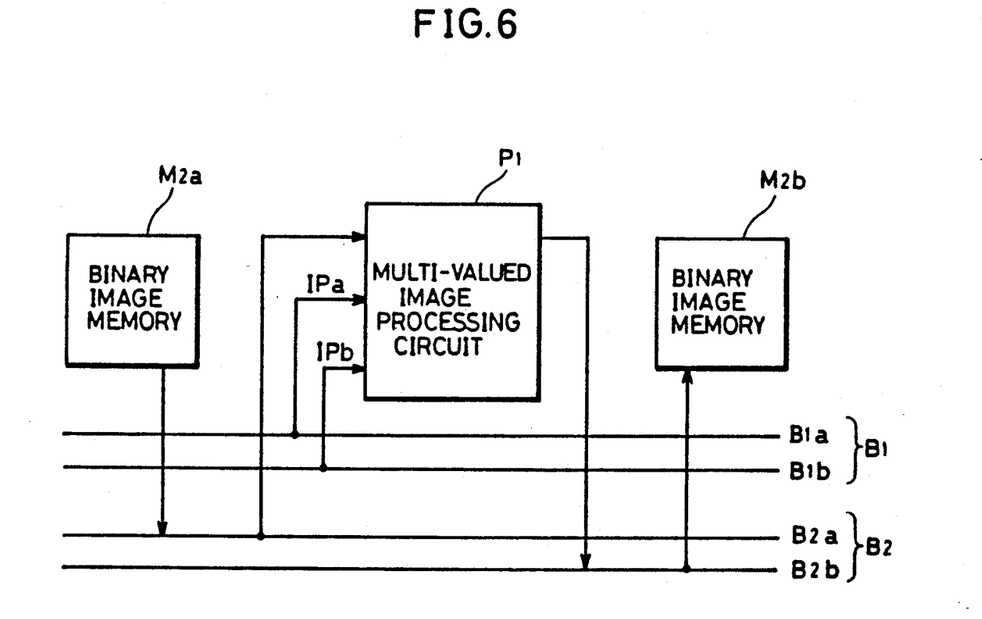
FIGS. 6 to 8 are block diagrams showing new connections between processing circuits and the binary image memory enabled by the present invention.

FIG. 6 shows basic connection of the multiple-valued image processing circuit P1 and the binary image memories M2a and M2b. The data read from the binary image memory M2a are applied to a function select input of the multiple-valued image processing circuit P1 through the binary image data bus B2a. More specifically, one data bus B2a is selected from the binary image data buses B2 in the binary image input circuit in the multiple-valued image processing circuit P2 and the selected binary image is applied to the function selector of the multiple-valued image processing circuit P1. Multiple-valued images of two systems are simultaneously inputted to the processing circuit P1 from the multiple-valued image data buses B1a and B1b. In this example, two types of arithmetic processing are switched on pixel by pixel basis to be effected on the multiple-valued images inputted from the data buses B1a and B1b and a binary image is outputted to the binary image data bus B2b as the result of processing. The binary image on the data bus B2b is written in the binary image memory M2b. As described above, according to this embodiment, the binary image input and output to and from the multiple-valued image processing circuit P1 is enabled for binary image memories M2a and M2b used for general purposes and not for a conventional binary image memory Mp arranged attendant on the processing circuit P1.

Figure 7:
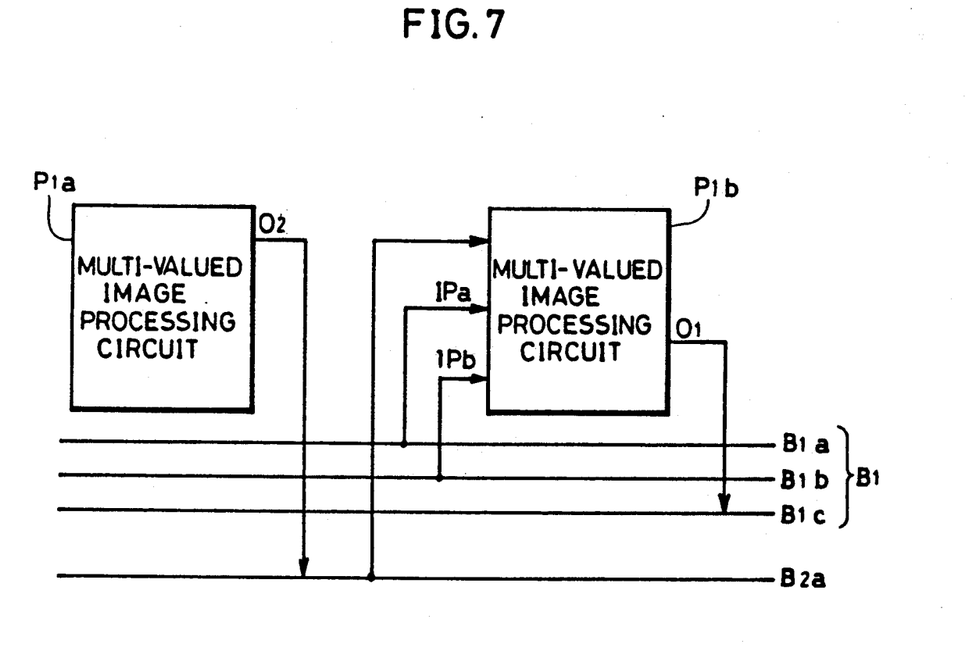

FIG. 7 shows two multiple-valued image processing circuits P1a and P1b connected by a data bus B2a for binary images. The first processing circuit P1a receives a multiple-valued image from a channel, not shown, of the binary image data bus B1 and processes the input data to provide a resulting binary image to the binary image data bus B2a. The second processing circuit P1b receives multiple-valued images of two systems from two data buses B1a and B1b out of the multiple-valued image data buses B1 to arithmetically process the same. On that occasion, it receives the binary image outputted from the first processing circuit P1a through the binary image data bus B2a, and two arithmetic functions are switched from each other on pixel by pixel basis using the inputted binary image. The result of processing of the multiple-valued images of the second processing circuit P1b is outputted to the multiple-valued image data bus B1c. As described above, according to this embodiment, the binary image for switching arithmetic functions of the multiple-valued image processing circuit P1 can be provided not only from the binary image memory but from other processing circuits outputting binary images. It should be noted that when an attendant binary image memory Mp is employed, the utilized binary image is a predetermined fixed data and, on the contrary, when a binary image outputted from the first processing circuit is utilized by the second processing circuit, the utilized binary image is a data obtained in parallel simultaneously with the process being executed. In other words, the present invention provides the possibility of executing a process, which needed a plurality of frames in the prior art, in real time. For example, when the above mentioned maximum value evaluating operation is carried out in the structure of FIG. 7, the borrow data is provided for every pixel in the first processing circuit P1 and the image data of two planes are switched between each other on pixel by pixel basis in the second processing circuit P2 based on borrow data, whereby the maximum value evaluating operation which needed 2 frames in the prior art can be executed in 1 frame.

In the foregoing, a multiple-valued image processing circuit is employed as the first processing circuit. However, it can be replaced with a binary image processing circuit.

Figure 8:
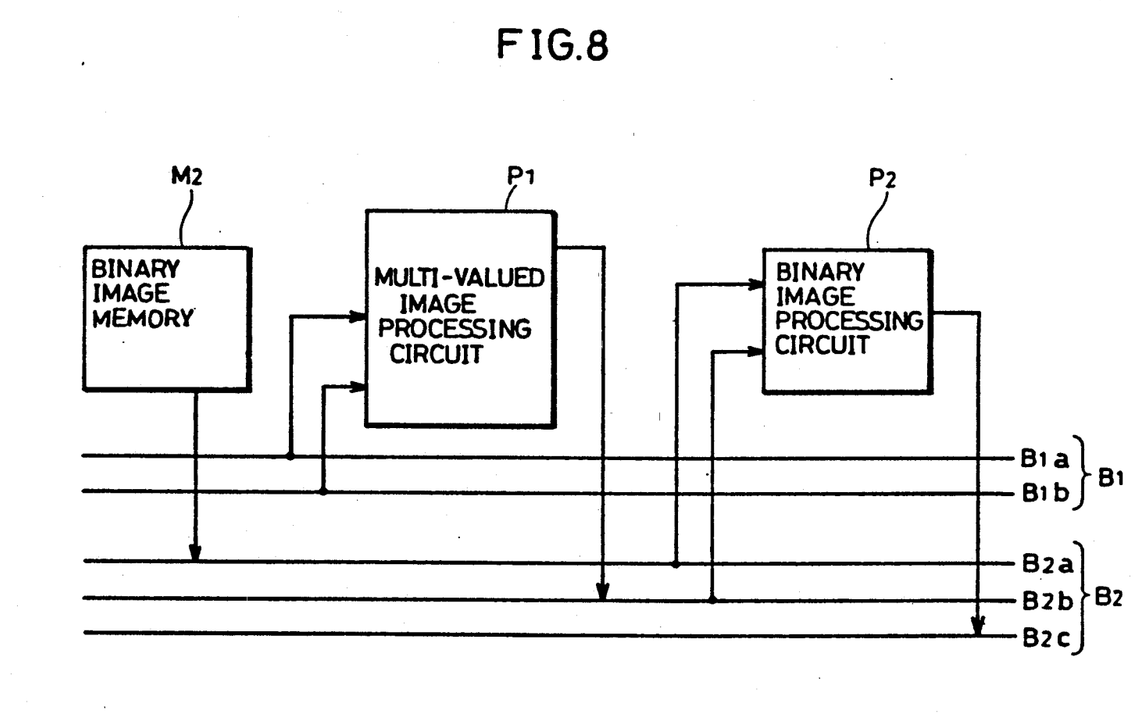

FIG. 8 shows the connection when a binary image generated from the multiple-valued image processing circuit P1 is utilized as the binary image to be inputted to the binary image processing circuit P2. The multiple-valued image processing circuit P1 receives two systems of multiple-valued images from two data buses B1a and B1b out of multiple-valued image processing data buses B1 to carry out some binary processes thereon, and output a result of processing to the binary image data bus B2b. Meanwhile, a binary image stored in the binary image memory M2 is read out to be outputted on the binary image data bus B2a. The binary image processing circuit P2 receives two binary images outputted respectively from the binary image memory M2 and the multiple-valued image processing circuit P1 through binary image data buses B2a and B2b to carry out some binary image processing thereon and outputs the resulting binary image to the binary image data bus B2c. Although there is no destination of the binary image data on the data bus B2c is shown in FIG. 8, the data may be received by another binary image memory or by other processing circuits for multiple-valued images or for binary images.

As described above, according to the present embodiment, not only the data read from the binary image memory but binary images outputted from other processing circuit can be employed as the data to be processed in the binary image processing.

New connections between each of the circuits enabled by the present invention are described with reference to the figures in the foregoing. It goes without saying that other new connections and more complicated connection combining conventional connections can also be utilized.

Although not employed in the foregoing, a processing circuit receiving binary images and outputting multiple-valued images may be incorporated in the image processing apparatus of the present invention. Processes provided by the circuit of this type are as follows: labeling process in which each of a plurality of independent objects in a binary image is numbered and the number data are outputted as pixel values of a multiple-valued image; shape histogram process in which a plurality of pattern matching are carried out for binary image data and codes corresponding to respective patterns are allotted to pixels coinciding with respective patterns, with the codes outputted as pixel values of a multiple-valued image; and so on.

Since the above embodiment has the above described structure and functions, storing, processing and transferring of binary images can be effectively carried out by utilizing the binary image memory M2, binary image processing circuit P2 and the binary image data bus B2, respectively. Namely, the storing of binary images can be effectively carried out by utilizing an image memory M2 for binary images having smaller memory capacitance, not by utilizing the image memory M1 for multiple-valued images having larger memory capacitance. The processing of the binary images as they are can be effectively carried out by utilizing binary image processing circuit P2 on arithmetic functions characteristic of binary images being effectively implemented in hardware, without requiring expansion of binary images to multiple-valued images. In addition, the transfer of binary images can be effectively carried out by utilizing one binary image data bus B2 for one plane of binary images, without occupying all bits of a multiple-valued image data bus B1 having a plurality of bit width.

The characteristic of the above described embodiment consists not only in the fact that the multiple-valued images and binary images are handled in completely separate systems, but also in the fact that the multiple-valued image processing circuit P1 and the binary image processing circuit P2 and the multiple image memory M1 and the binary image memory M2 can be freely connected to each other through the multiple-valued image data bus B1 or binary image data bus B2. In the prior art, the binary image memory Mp is arranged attendant on one processing circuit P1, so that operations between different binary image memories can not be effected, and the binary images generated from a first processing circuit can not be utilized in a second processing circuit. However, the above described embodiment enables such operations. Since binary image memory M2 is not subject to any specified processing circuit, the number of binary image memories and of processing circuits can be freely increased with small changes in design. Since the binary images on the binary image memory M2 may be utilized as the data to be processed, data resulting from the process or the data for control, there is no limit for the places of storing data regardless of the characteristics of the data. Therefore, operations such as processing control data can be carried out.

The binary images on the binary image data bus B2 can be inputted as control data for switching arithmetic functions of the processing circuit P1 on pixel by pixel basis. Consequently, the processing circuit P1 is capable of receiving control data not only from an arbitrary binary image memory but also from other processing circuits outputting binary images. Therefore, a plurality of processing circuits can be operated in parallel to each other simultaneously, thereby enhancing ability of parallel processing employing multiple-valued images and binary images simultaneously.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital image processing apparatus comprising:
    an image input circuit for inputting image data;
    an image output circuit for outputting image data;
    an image memory for storing image data, separately comprising a multiple-valued image memory for storing data of a multiple-valued image having a plurality of bits of information per 1 pixel, and a binary image memory for only storing data of a binary image having 1 bit of information per 1 pixel;
    a processing circuit for processing image data, separately comprising a first multiple-valued image processing circuit for processing a multiple-valued image, and a binary image processing circuit for processing only a binary image, wherein said first multiple-valued image processing circuit connects to both of said multiple-valued image data bus and said binary image data bus;
    control means for controlling said input circuit, said output circuit, said image memory and said processing circuit; and
    a common image data bus connected to said image input circuit, said image output circuit, said image memory and said processing circuit for transferring image data, separately comprising a multiple-valued image data bus for transferring only data of the multiple-valued image between circuits handling multiple-valued images, and a binary image data bus for transferring only data of the binary image between circuits handling binary images.

2. A digital image processing apparatus according to claim 1, wherein
    said control means is a host CPU having controlling software for controlling said image input circuit, said image output circuit, said image memory and said processing circuit, and image processing software for image processing based on the software; and
    said image input circuit, said image output circuit, said image memory and said processing circuit are connected to said host CPU through a host CPU bus.

3. A digital image processing apparatus comprising:
    an image input circuit for inputting image data;
    an image output circuit for outputting image data;
    an image memory for storing image data;
    a multiple-valued image processing circuit for processing image data;
    control means for controlling said image input circuit, said image output circuit, said image memory and said processing circuit;
    a common image data bus connected to said image input circuit, said image output circuit, said image memory and said processing circuit for transferring image data, separately comprising a multiple-valued image data bus for transferring data of a multiple-valued image having a plurality of bits of information per 1 pixel, and a binary image data bus for transferring only data of a binary image having 1 bit of information per 1 pixel; and said multiple-valued image processing circuit connecting to both of said binary and multiple-valued data buses and comprising a first processing circuit capable of outputting image data of the binary image to said binary image data bus as a result of processing, and a plurality of second processing circuits capable of switching process functions on a pixel by pixel basis utilizing the binary image data on said binary image data bus.

4. A digital image processing apparatus according to claim 3, wherein the first processing circuit and the second processing circuit can be operated simultaneously.

5. A digital image processing apparatus according to claim 3, wherein said image memory separately comprises a multiple-valued image memory connected to said multiple-valued image data bus, and a binary image memory connected to said binary image data bus; and said control means is capable of a first control in which a binary image as a result of processing of said first processing circuit is stored in said binary image memory, and of a second control in which said second processing circuit is operated with process functions switched by the binary image stored in said binary image memory.

6. A digital image processing apparatus according to claim 5, wherein said first processing circuit and said second processing circuit have the same process function.

7. A digital image processing apparatus according to claim 3, wherein said first processing circuit processes a binary image data on said binary image data bus, obtains a binary image data as a result of processing and outputs the same to said binary image data bus; and said second processing circuit processes a multiple-valued image data on said multiple-valued image data bus, obtains a multiple-valued image data as a result of processing, and outputs the same to said multiple-valued image data bus.

8. A digital image processing apparatus according to claim 3, wherein said first processing circuit processes a multiple-valued image data on said multiple-valued image data bus, obtains a binary image data as a result of processing, and outputs the same to said binary image data bus; and said second processing circuit processes a multiple-valued image data on said multiple-valued image data bus, obtains a multiple-valued image data as a result of processing, and outputs the same to said multiple-valued image data bus.

9. A digital image processing apparatus according to claim 1, wherein said binary image processing circuit connects to said binary image data bus only.

10. A digital image processing apparatus according to claim 9, wherein said multiple-valued image memory connects to said multiple-valued image data bus and said binary image memory connects to said binary data bus.

11. A digital image processing apparatus according to claim 10, wherein said image input circuit and said image output circuit connect to multiple-valued image data bus.

12. A digital image processing apparatus according to claim 1, wherein said first multiple-valued image processing circuit has input means for inputting image data from one set of said binary image data bus and two sets of said multiple-valued image data bus.

13. A digital image processing apparatus according to claim 12, wherein said first multiple-valued image processing circuit switches process functions pixel by pixel on the basis of the binary image data inputted from said input means.

14. A digital image processing apparatus according to claim 13, further comprising a second multiple-valued image processing circuit which processes image data simultaneously with said first multiple-valued image processing circuit and outputs binary image data to said binary image data bus connected to said input means of said first multiple-valued image processing circuit.

15. A digital image processing apparatus according to claim 13, wherein said binary image processing circuit process image data simultaneously with said first multiple-valued image processing circuit and outputs binary image data to said binary image data bus connected to said input means of said first multiple-valued image processing circuit.

16. A digital image processing apparatus according to claim 13, wherein said multiple-valued image memory outputs binary image data to said binary image data bus connected to said input means of said first multiple-valued image processing circuit.

* * * * *